March 14, 1939.   R. WARREN ET AL   2,150,853

CAMERA

Filed May 19, 1938   2 Sheets-Sheet 1

Inventors
Ralph Warren
Theodor S. Geisel,

By Harry A. Yerkes Jr.
Attorney.

March 14, 1939.   R. WARREN ET AL   2,150,853
CAMERA
Filed May 19, 1938   2 Sheets-Sheet 2

Inventors
Ralph Warren
Theodor S. Geisel,

By Harry A. Yerkes Jr.
Attorney

Patented Mar. 14, 1939

2,150,853

UNITED STATES PATENT OFFICE

2,150,853

CAMERA

Ralph Warren and Theodor S. Geisel, New York, N. Y.

Application May 19, 1938, Serial No. 208,894

7 Claims. (Cl. 95—18)

This invention relates to photographic apparatus, and particularly to a multiple-objective camera adapted to photographically record a composite image of portions of two or more objects.

Various forms of multiple-objective cameras have been devised for use in aerial photography wherein a plurality of areas are simultaneously photographed and subsequently combined into a unitary mosaic map. Double-objective cameras for superimposing images of actors on images of artificial backgrounds are well known in the movie industry. It is also known to photographically record both a subject and an information card on a single film or plate.

It is the object of this invention to provide an improved multiple-objective camera for photographically recording on a single negative a correlated composite image of portions of two or more subjects.

It is also the object of this invention to provide a camera for making humorous photographs comprising a portion of one subject properly aligned with a portion of another subject or subjects.

It is another object of this invention to provide an apparatus for simultaneously photographing on a single negative selected portions of two or more persons so aligned as to produce a composite picture which is instructive, entertaining and amusing.

It is another object of this invention to provide a camera of the type described which is simple to construct and relatively easy to operate.

Other objects and advantages of this invention will be readily apparent from the following description of an embodiment of the invention illustrated in the accompanying drawings in which.

Figure 1:
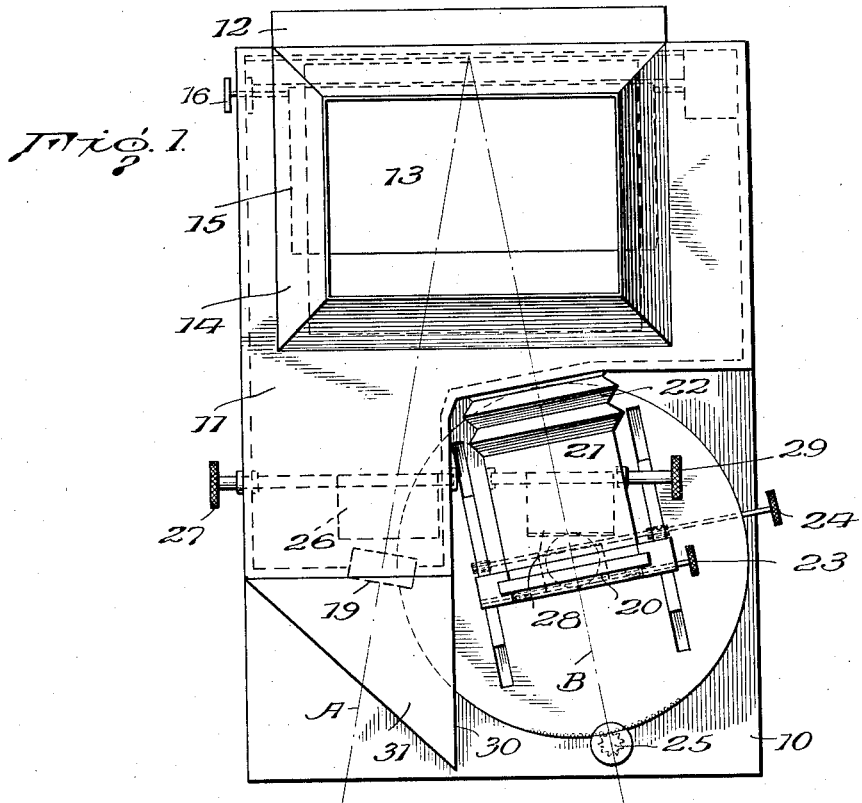
Figure 1 is a plan view of a preferred form of camera constructed according to this invention.
Figure 2:
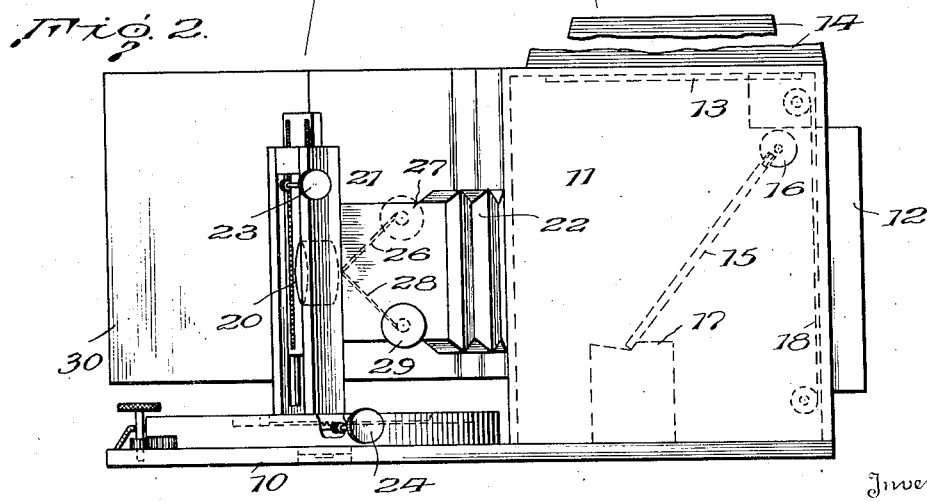
Fig. 2 is a side elevation of the camera shown in Figure 1.
Figure 3:
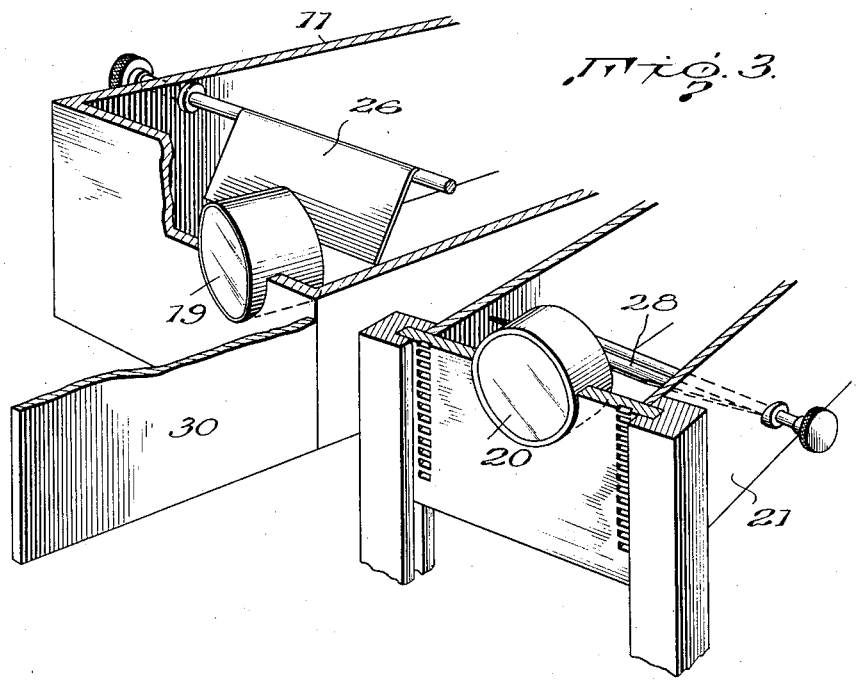
Fig. 3 is a perspective view, partly cut away, showing the relative arrangement of the objective lenses and baffle screens provided in the camera of Figures 1 and 2.

Referring to Figures 1 and 2, for the purposes of illustration, the base of the camera is indicated by the numeral 10. The body of the camera comprises a light-tight box structure 11 secured to the base 10. A film pack or holder 12 is removably secured at the back of box 11, and may be of any suitable construction for holding a sensitized plate or film in cut or roll form. A conventional translucent viewing screen 13 surrounded by a light shield 14 is provided on the top of the camera box 11 above a reflex mechanism 15. The reflex or reflector mechanism 15 is provided with the usual control 16 and positioning stop 17, which permit adjustment to the position shown in dotted lines in Figure 2, for projecting an image of subjects to be photographed to the viewing screen 13. A focal plane shutter 18, also indicated in dotted lines, is provided adjacent the negative film or plate holder 12.

The camera illustrated is provided with two objectives or lenses 19 and 20, each of which has the conventional focusing adjustment. The objective 19 is mounted in the front of the camera box 11 at an angle such that its axis A intersects the sensitized film or plate at its center. The objective 20 is mounted in an adjustable housing 21, connected to the camera box 11 by a light-tight bellows arrangement 22. The objective supporting housing 21 is provided with suitable adjusting mechanisms, 23, 24 and 25, for adjusting the position of the objective 20 vertically, axially, and about a vertical axis, respectively. The vertical axis adjustment 25 permits the objective 20 to be positioned so that its axis B intersects the sensitized film or plate at its center with the axis A of objective 19. The camera may be provided with more than two objectives, the additional objectives being mounted in the same manner as objective 19, or as objective 20. An adjustable baffle or screen 26, mounted on suitable pivots in the camera box 11 behind the objective 19, is provided with a control knob 27. The adjustment axis of baffle 26 is preferably parallel to the sensitized film or plate. Baffle 26 is of such size as to extend below the axis A of objective 19 when turned to a vertical position, and to be adjustable to a position in which it is entirely above the objective axis. A similar adjustable baffle or screen 28 is journaled in the housing 21 behind the objective 20. It is journaled approximately parallel to the sensitized film and is provided with a control knob 29. Baffle 26 is arranged to obstruct the upper half of the image projected toward the film by objective 19, whereas baffle 28 is arranged to obstruct the lower half of the image projected by objective 20. The baffles may be provided with straight edges, as shown, or may have complementary irregular edges depending on the nature of the composite image desired. Likewise the baffles may be adjustably supported on pivots whose axis is other than horizontal, or supported in guide slots or the like, as will be obvious to one skilled in the camera art.

The objective 19 may be provided with suitable hoods or light shields such as the forwardly extending partition 30 and the shield 31. These shields prevent each objective from receiving light from the subject viewed by the other objective.

Figure 4:
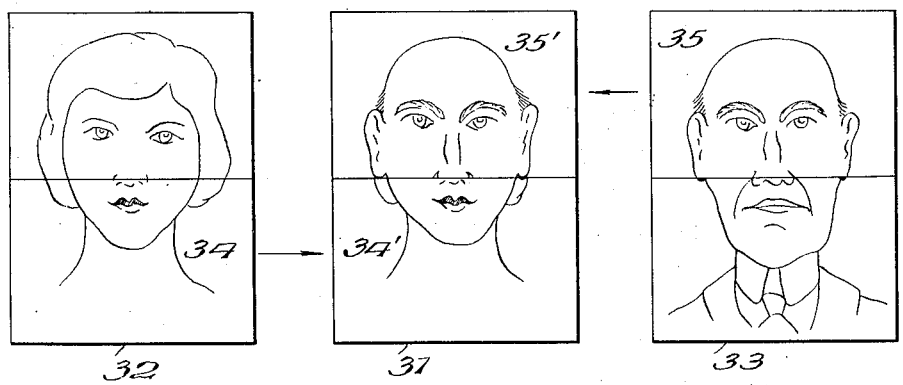
Fig. 4 is a diagrammatic view illustrating one form of composite photograph which this camera is adapted to produce.

The composite photograph 31, shown in Figure 4, illustrates the result obtained when the camera of this invention is used to combine the lower facial features of a woman, whose normal photograph would appear as shown at 32, with the upper facial features of a man, whose normal photograph would appear as shown at 33. Selected portions 34 and 35 of two subjects 32 and 33 are combined to produce the composite photograph 31 consisting of the aligned selected portions 34' and 35'.

The operation of the camera illustrated and described is as follows. The two subjects or objects, of which a composite photograph of selected portions is to be made, are positioned in the view of the objectives 19 and 20, respectively. Suitable illumination may be provided by conventional floodlamps or the like. The objectives 19 and 20 are individually adjusted and focused, the reflex mechanism 15 being in the position shown in Figure 2 to permit the camera operator to view the image of his subjects on the viewing screen 13. The baffles 26 and 28 are independently adjusted by knobs 27 and 29 to block out undesired portions of each of the two camera subjects. The position of objective 20 is adjusted by controls 23, 24 and 25 to cause the lines of the image from objective 20 to align and meet with the lines of the image from objective 19. Slight readjustment of the baffles 26 and 28 may be necessary to secure the desired correlated composite image. The reflex mechanism may then be raised and the shutter 18 operated to expose the sensitized plate or film in holder 12 in the usual manner.

The camera of this invention is particularly adapted for use in places of amusement, such as shows and exhibitions, for making humorous pictures of persons' faces. Obviously it may be used for a wide variety of subjects including people, animals, scenery, prepared designs and the like. Simple modification of the baffle edge or baffle mounting axis may be used to widen the range of amusing effects that are attainable.

It is apparent that many variations in the form of the baffle devices and in the nature of the camera details may be designed by those skilled in the art, without departing from the scope of this invention, which contemplates the use of any equivalent devices within the terms of the following claims.

We claim:

1. In photographic apparatus for producing composite pictures of correlated portions of a plurality of objects, the combination comprising, a camera box, a plurality of objectives mounted in said box, at least one of said objectives being adjustably mounted for shifting its axis relative to the axis of another objective, means for holding a sensitized element positioned in said box in approximately the focal plane of said objectives, and baffle means adjustably supported in said box between said objectives and said sensitized element for blocking undesired portions of the images directed toward said element by said objectives.

2. In photographic apparatus for producing composite pictures made up of desired portions of more than one object, the combination comprising, a camera box, a pair of objectives, one of said objectives being mounted in said box, the other of said objectives being mounted in a movable support connected to said box, means for adjusting the position of said support with respect to said box, means for holding a sensitized element positioned in said box in approximately the focal plane of both of said objectives, and baffle means adjustably supported in said box between said objectives and said sensitized element for blocking undesired portions of the images directed toward said element from said objectives.

3. In photographic apparatus for producing composite pictures of correlated portions of more than one object, the combination comprising, a camera box, a pair of objectives mounted in said box, means for holding a sensitized element positioned in said box in approximately the focal plane of both of said objectives, the axis of each of said objectives intersecting at approximately the center of said sensitized element, and baffle means adjustably supported in said box between said objectives and said sensitized element for blocking undesired portions of the images directed toward said element by said objectives.

4. In photographic apparatus for producing composite pictures of correlated portions of more than one object, the combination comprising, a camera box, a pair of objectives mounted in said box, means for holding a sensitized element positioned in said box, an adjustable baffle for each of said objectives positioned between said objectives and said sensitized element and arranged to pivot on axes approximately parallel to said element for blocking undesired portions of the images directed toward said element by said objectives.

5. In photographic apparatus for producing composite pictures of correlated portions of more than one object, the combination comprising, a camera box, a pair of objectives mounted in said box, means for holding a sensitized element positioned in said box, a baffle for each of said objectives positioned between said objectives and said sensitized element and supported on pivots having horizontal axes, one of said baffles being adjustable to block approximately the upper half of the image directed toward said element by one objective and the other of said baffles being adjustable to block approximately the lower half of the image directed toward said element by the other objective.

6. In photographic apparatus for producing a composite image on a single negative of correlated portions of two objects, the combination comprising, a camera box, a pair of objectives mounted in said box, one of said objectives being supported for angular adjustment with respect to the body of said box, means to adjust said latter objective vertically, axially, and about an axis perpendicular to its objective axis, a light shield between said objectives outside of said box, means for holding a sensitized element positioned in said box in approximately the focal plane of both of said objectives, baffle means adjustably supported in said box between said objectives and said sensitized element for blocking undesired portions of the images directed toward said element by said objectives, a viewing screen and reflex means for indicating the composite image from said objectives and baffle means, and a focal-plane shutter for exposing said sensitized element to said composite image.

7. In photographic apparatus for producing composite pictures of correlated portions of a plurality of objects, the combination comprising, a camera box, a plurality of objectives mounted in said box, at least one of said objectives being adjustably mounted for shifting its axis relative to the axis of another objective, means for holding a sensitized element in said box in approximately the focal plane of said objectives, and baffle means associated with each objective for blocking undesired portions of said objects and to produce at the focal plane of said objectives a composite image of correlated unblocked portions of the said plurality of objects.

RALPH WARREN.
THEODOR S. GEISEL.